Figure 1:
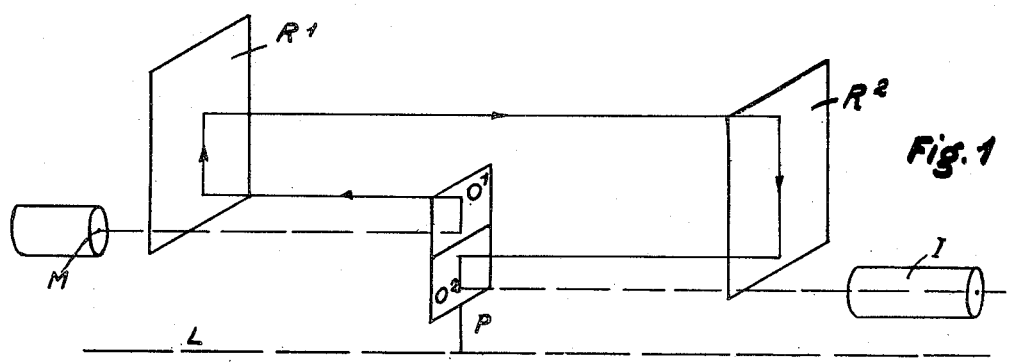

April 17, 1951

B. E. A. M. CUNY 2,549,669

OPTICAL INSTRUMENT FOR TESTING PLANE
SURFACES AND RECTILINEAR LINES

Filed April 13, 1945

3 Sheets-Sheet 1

Inventor:
Bernard Eugene Adrien Marie Cuny
By Williams, Bradbury & Hinkle
Attorneys Patented Apr. 17, 1951

2,549,669

UNITED STATES PATENT OFFICE 2,549,669

OPTICAL INSTRUMENT FOR TESTING PLANE SURFACES AND RECTILINEAR LINES

Bernard Eugène Adrien Marie Cuny,
Paris, France

Application April 13, 1945, Serial No. 588,092
In France September 1, 1943

Section 1, Public Law 690, August 8, 1946
Patent expires September 1, 1963

4 Claims. (Cl. 33—172)

This invention relates to optical testing or measuring devices for testing the accuracy of plane surfaces or surfaces formed by rectilinear generatrixes. It is an object of this invention to provide devices serving the purposes here in view which avoid certain drawbacks adhering to the devices hitherto used for these purposes.

The testing of plane surfaces or surfaces formed by rectilinear generatrixes requires the solving of the following problems: the testing as to whether a certain number of points are or are not in the same plane or on the same straight line and the measuring of their distance from said plane or said straight line.

These problems may be solved optically, due to the fact that light is propagated along a straight line.

All optical apparatuses which measure directly such distances or errors comprise a stationary optical instrument through which a sight may be observed, which is being shifted in contact with the part to be tested.

As this shifting of the sight causes the distance of the sight from the optical instrument to vary, the observer must, for every position of the sight refocus the image seen through the optical instrument. This focussing may be obtained by displacing an element forming part of the optical instrument, such as an eyeglass, a lens of an objective, etc., or independently of said lens, for instance by the translation of a bath of mercury arranged in front of the object-lens so as to maintain a constant value for the optical path between the sight and said lens.

The existing devices show several drawbacks.

(a) Except in the cases of displacements of the eye-piece and of the mercury bath the guiding of the movable optical element allowing the focussing must be accomplished with a very high accuracy, the correctness of the measurements is not absolutely ensured, as the different parts may be damaged and play or lost motion may appear by reason of the wear of said parts without the observer being even aware of such wear.

When the observing lens provides duplication and reversal of one of the images, the displacement of the eye piece for focussing has in fact theoretically no action on the measures made, but there remains the serious drawback in that, when the observer touches the observing lens, the latter may move and consequently is no longer adjusted.

(b) Each measuring requires the positioning of the sight on the part to be tested and the displacement of the part providing the focusing of the images, i. e. two operations. It is thus not possible to proceed speedily and in a continuous manner with a series of measurings. This drawback is particularly serious when the human eye is replaced by a photographic device for recording the distances.

Obviously it is possible to devise a suitable mechanical connection that may allow the control of the focussing devices by means of the displacement of the sight; but as in all existing devices, the displacement of the sight and of the focussing device are not of the same magnitude, such an arrangement would lead to intricate and delicate mechanisms and therefore to new possible sources of misadjustment.

The present invention has for its object to avoid such drawbacks. Its chief feature lies in that the feeler forming part of the testing means, as in all known apparatuses of this type, and which is moved in contact with or at a predetermined distance from the part to be tested, is no longer as in the existant apparatuses an element carrying a mere mark or sight, but a mechanical member carrying at least two optical elements or else a single element adapted to receive a double impact of light and which therefore has a double action.

A further feature of the invention lies in that the feeler is arranged between two reflecting systems, in such a manner that the light progresses along the path of constant length starting from the feeler and returns to it after reflection on these two reflecting systems, this characteristic circuit forming a part of the path followed by the light for forming the final image of the sight.

It is possible through this characteristic arrangement according to the invention to keep constant the focussing of the final image observed. In effect if the sight is stationary and the observation instrument is stationary also, the observation instrument and the sight are arranged an opposite sides of the feeler; the total path followed by the light between the sight and the instrument is consequently constant. If the sight is movable and carried by the feeler while the observation instrument is stationary, the optical elements of the feeler and of the reflectors should be chosen in a manner such that the image of the sight formed after the light has passed through the above mentioned characteristic circuit is removed to the infinite i. e. at a constant distance from the observation instrument. If finally the sight and the observation instrument are both movable, being mounted on the feeler, the optical elements of the feeler and of the end reflectors should be chosen in a manner such that the sight image, formed after the characteristic circuit has been gone through, lies at a constant distance, whether finite or infinite, from the feeler.

In all cases, it should be noted that the constancy of the focusing is obtained without any optical elements being displaced, except for those carried by the feeler and moving integrally with it. Consequently for effecting a measuring, it is sufficient to displace a single part and to perform a single operation only.

For the purpose of measuring the distances of planeness or alignment the above mentioned feeler is moved on the part to be tested, the image being then observed of hair lines which may or may not be carried by the feeler. If the image in the ocular remains motionless, the evenness or rectilinearity of the part under test is perfect; if not, the apparent transversal displacements of this image, i. e., the displacements in a direction perpendicular to the plane or straight line to be tested allow the distance with reference to said plane or line to be measured.

The fact that the hair lines are not carried of necessity by the feeler as in the arrangements devised heretofore forms a particular feature of the novel testing instrument according to the invention.

The invention is illustrated, diagrammatically by way of example, in the accompanying drawing wherein Figs. 1 to 4 are four diagrammatical views illustrating the principle of the invention.

Figs. 5 to 12 show different forms thereof.

The arrangement of Fig. 1 is applicable to the case where the hair lines sight M is stationary. The feeler P is arranged to move along the line L undergoing testing.

This feeler comprises always at least two optical elements $O_1$ and $O_2$ constituted by lenses or reflecting systems either plane, spherical or cylindrical and the other reflecting systems are diagrammatically shown by the two rectangles $R_1$ and $R_2$.

In the case of Fig. 1, these two optical elements $O_1$ and $O_2$ are constituted by two reflecting systems illustrated diagrammatically by the two superposed rectangles $O_1$ and $O_2$.

The light rays emitted by the hair lines contained in the cylindrical sight M follow first the path $MO_1$ drawn in dotted lines and are then reflected from the feeler from which they impinge on the two reflecting surfaces or systems $R_1$ and $R_2$ and finally return to the feeler element $O_2$. The optical circuit $O_1$, $R_1R_2O_2$ which forms the characteristic feature of the invention is shown on the figure in full-drawn lines.

After reflection at $O_2$, the light rays impinge on the ocular of the observation instrument I.

The diagram of Fig. 1 shows that the optical circuit, starting from the feeler and returning thereto after reflection on two reflecting surfaces mounted at the two ends of the straight line along which the testing is being performed, is of constant length.

The upper path between $R_1$ and $R_2$ is constant as the reflecting systems $R_1$ and $R_2$ are stationary. The sum of the two lower paths $O_1R_1$ and $O_2R_2$ is obviously constant. Supposing the feeler P moves towards the left, the path $O_1$, $R_1$ is reduced by a certain amount and the path $O_2$, $R_2$ increased by an equal amount. The sum of the paths $MO_1$ and $O_2$ I is constant for the same reason.

The consequence of these considerations is that, whatever the position of the feeler P on the part undergoing the testing may be, the image of the hair lines sight M in the feeler and stationary reflector system remains always at the same distance from the observation instrument I which is stationary in the case illustrated.

Figure 2:
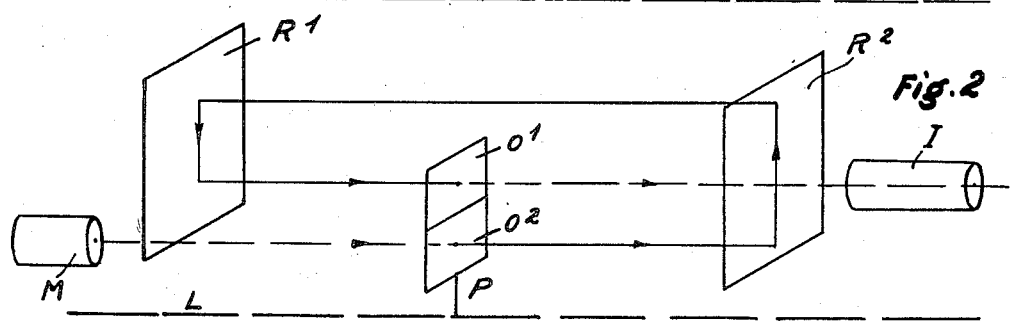

In the case of Fig. 2, the two reflecting elements of the feeler are replaced by systems $O_1O_2$ through which the light passes. The optical circuit becomes under these conditions that of the line $M-O_2-R_2-R_1-O_1-I$, the length of which is also constant.

Figure 3:
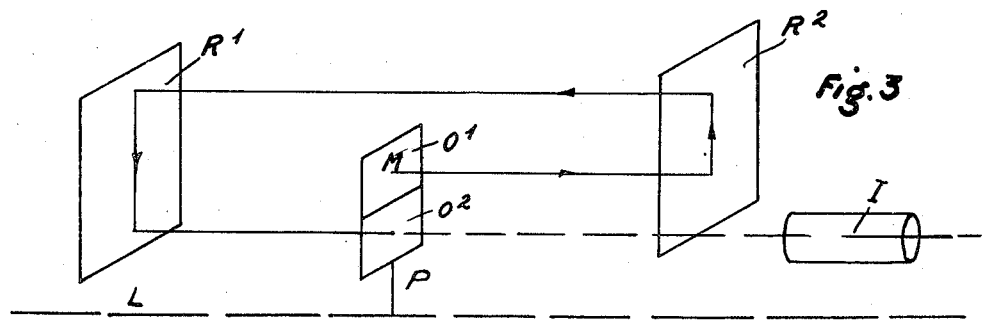

Fig. 3 shows an arrangement in which the hair lines sight is carried by the feeler. In this case, the hair lines will be considered as one of the optical elements of the feeler. If the sight M is located at $O_1$, the other element located at $O_2$ is an element through which the light passes.

The image of the sight is again stationary as it is thrown into the infinite, whatever may be the position of the feeler on the straight line which is being tested.

Figure 4:
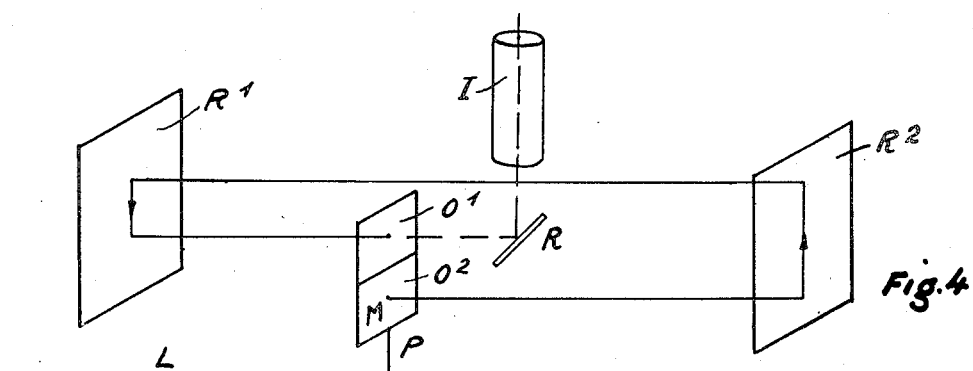

In the case of Fig. 4, the sight M is formed integral with the element $O_2$ of the feeler, whereas the element $O_1$ is an element through which the light passes.

The observation instrument I is then fixed to the feeler. A complementary mirror R allows a suitable direction to be given to said instrument. As the latter is fixed to the feeler, it follows it through all its displacements. The focussing remains constant; but in this case the image of the sight as provided by the system constituted by the feeler and the stationary mirrors does not require being thrown into the infinite.

This special feeler shows moreover a further property which allows accurate measuring. The two optical elements which it comprises are chosen in a manner such that their small transversal displacements due to small defects as to evenness or rectilinearity in the parts to be tested are transformed into a displacement of the image.

Whatever arrangement is adopted, the optical elements forming the stationary end reflectors are chosen in a manner such that both optical elements of the feeler cooperate in the same direction and not in opposite directions to produce the apparent transversal displacement of the image which is to be measured. In other words, these displacements produced by said optical elements must always be added to one another and not subtracted from one another and this is always feasible as is well known, the direction in which an image is displaced, can always be changed by adding or subtracting a reflection. Consequently, it is always possible to cause the effects produced by the displacement of the feeler to produce in the observation instrument additional effects.

As has already been disclosed, it is possible, if desired, to choose the optical elements of the feeler and of the end reflectors in a manner such that the image of the sight be formed at a constant, finite or infinite distance from the observation instrument in which the distance or errors to be measured are observed under the form of the displacement of the sight image. Such a spacing will moreover, be measured by means of the usual known methods (micrometric eye-pieces, blade, prism, lens or the like deflectors) or else of micrometric displacements of the optical elements of the feeler until the two sight images considered are brought into contact. It is also possible to use a graduated micrometer, arranged in the plane of the image formed in the observation instrument and to read directly the spacing between the two sight images.

I will now describe, solely by way of example, several practical forms of the testing instrument which forms the object of my invention.

In practice, this instrument is constituted by three separate systems only, arranged in the vicinity of the feeler and of two end reflectors respectively. According to the case, the sight hair lines and the observation instrument are integral with the end reflectors described herein above or with the feeler.

Figure 5:
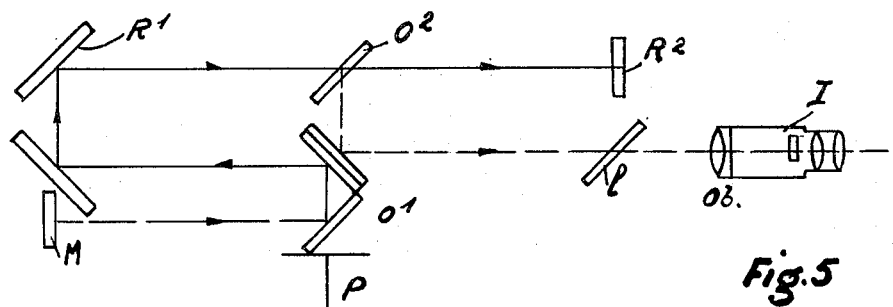

Fig. 5 shows a testing instrument allowing the testing of the evenness of a plane. The sight M is stationary and independent of the feeler.

The optical elements $O_1$ and $O_2$ of the feeler are constituted by two dihedrons whose edges extend in parallel to the plane to be tested. One of the two plane-parallel mirrors of the dihedron $O_2$ is semi-silvered. Of the end reflectors one is a dihedron $R_1$, the other a plane mirror $R_2$.

The device for measuring the distance or errors is constituted by a plane-parallel element $l$ forming an adjustable angle with the axis of the system and arranged in front of the objective $Ob$ of the observation instrument I which may, in this case, be a mere view finder. When examining the formation of the images, it is apparent that the displacements of images resulting from the transversal displacements of the feeler perpendicularly to the surface tested are added together while those parallel to said plane are subtracted one from another. The arrangement shown only allows therefore the testing of the evenness of a plane.

Figure 6:
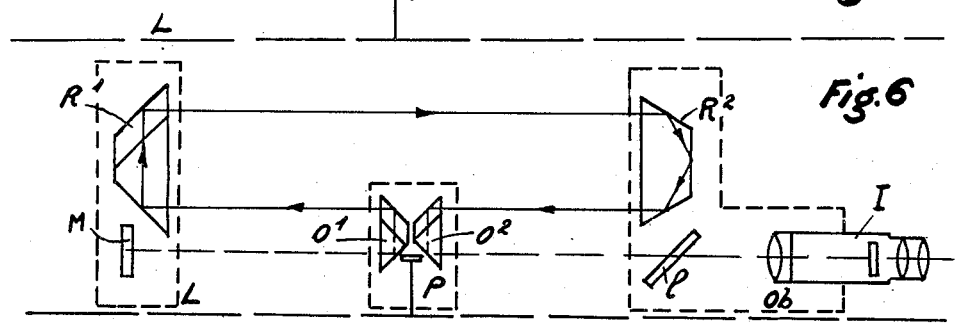

Fig. 6 shows means for testing errors both in evenness and in rectilinearity wherein the two optical elements carried by the feeler P are two orthogonal trihedrons $O_1$ and $O_2$, each formed by three planes perpendicular to one another.

The hair-lines sight M is stationary and mounted on the first or inlet reflector $R_1$, also formed by an orthogonal trihedron. The other end reflector $R_2$ is formed by a prismatic body allowing three reflections on three reflecting surfaces intersecting one another along parallel lines, all perpendicular to the direction L along which the testing is to be effected.

The image of the hair-lines sight is observed by means of a hair-lines view finder I rigid with the reflector $R_2$. There is shown as a measuring instrument a plane-parallel element $l$, the angular position of which is adjustable with reference to the optical axis, said element being adapted therefore to be adjusted in two directions perpendicular one with reference to the other so as to allow the measurement of the distance or errors along both directions.

The sensitivity of the testing system is apparent by reason of the amplification of the distance or errors. In fact, a distance $e$ shown up by the feeler produces a displacement of the image which is approximately that corresponding to a displacement of the hair-lines sight equal to $4e$.

When examining the formation of the images, it is apparent that the displacements of the images resulting from the transversal displacements of the feeler perpendicularly to the straight line tested are added one to another. This allows therefore a testing of rectilinearity along line L.

Figure 7:
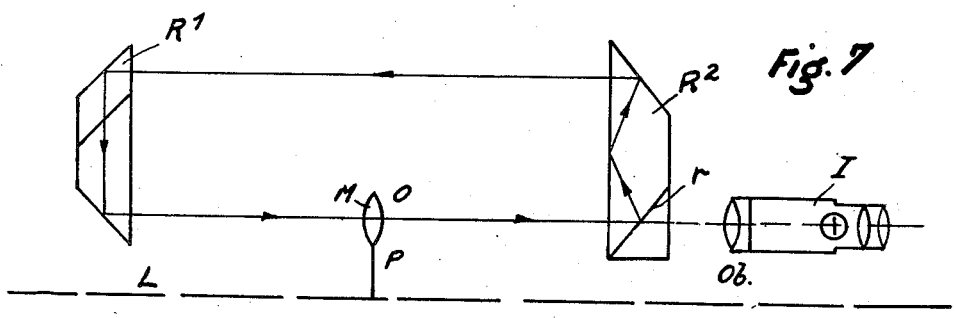

Fig. 7 shows means for testing evenness and rectilinearity wherein the hair-lines sight is mounted on the feeler.

The two optical elements forming the latter are constituted by the hair-lines sight M and the ocular O with the particular feature that the hair lines are drawn on the ocular. The end reflectors are constituted by a trihedral prism, $R_1$, i. e. a prism having three preferably orthogonally intersecting surfaces and a prism $R_2$ providing three reflections, the three reflecting surfaces intersecting one another along parallel lines all perpendicular to the line L along which the testing is to be performed. The spacing between the two prisms $R_1$ and $R_2$ is such that the circuit of constant length travelled over by the light between the sight M on the feeler and its object glass O equal to the focal length of the latter. The image of the sight is therefore always at the infinite.

This image is observed through the hair lines glass $l$ which is focussed for the infinite. The luminous rays pass to this effect through a semi-silver coating applied against the surface $r$ of the reflector $R_2$. The measuring of the distances or errors affecting the evenness of a plane or the rectilinearity of a line is effected for instance through a micrometric eye-piece.

In the arrangement shown, the errors or distances are added in all directions perpendicular to the line L. This renders the testing of rectilinearity possible.

Figure 8:
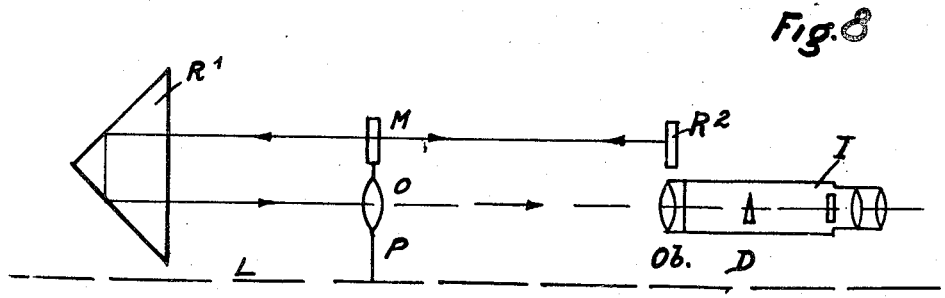

It is possible when it is desired to test only unevenness, to modify this arrangement in the manner illustrated in Fig. 8.

The sight M is again secured to the feeler, but is no longer on the ocular O. The reflector $R_1$ is a dihedron the reflecting surfaces of which intersect one another along a line which is parallel to the plane to be tested, and the mirror $R_2$ is a plane mirror, perpendicular to the line L along which the evenness of a plane is being tested.

The optical circuit of constant length which starts from the sight M and ends at the feeler is equal to the focal length of the ocular O. The image of the sight is, here again, rejected into the infinite and observed in an observation glass I which always remains focussed for the infinite.

The measurement of the distances or errors is performed by displacing a deflecting prism D arranged between the ocular $Ob$ of the observation instrument I and the plane of the image produced by the latter. In this case, the distance or errors are only added when they occur in a vertical direction, the arrangement being considered as shown in Fig. 8. Consequently said arrangement allows only the testing of plane surfaces.

It should be remarked however that, as in the case of all evenness testing means, the device just disclosed might serve as a line testing means when two successive series of measurings are effected with it. This would allow the spacing of the points considered with reference to two planes, preferably orthogonal, which are parallel to the straight line on which said points should lie.

Figure 9:
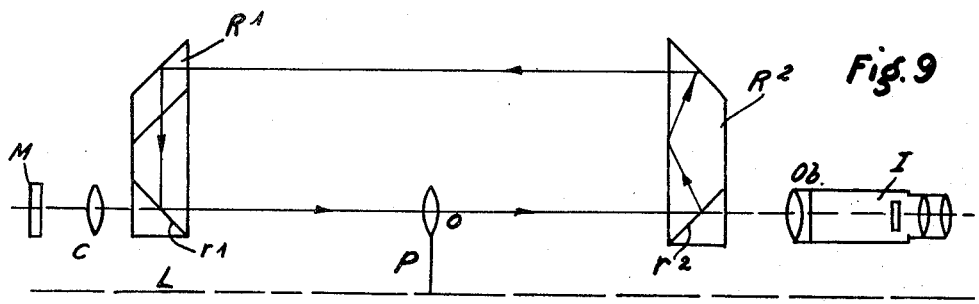

Fig. 9 shows a form of an instrument for testing plane surfaces and straight lines, which is similar to that shown in Fig. 7, but wherein the sight M is not carried by the feeler P. The optical elements of the latter comprise two oculars formed in one at O. The end reflectors and the observation glass are identical with those shown in Fig. 7. The spacing between the reflectors $R_1$ and $R_2$ is such that the circuit of constant length which forms the main feature of the invention, has a length which is equal to the double of the focal length of the ocular O. Under such conditions it produces an image of an object located at the infinite which is also at the infinite, as the light passes twice through the ocular O.

In the present case, the sight M is located at the focus of an ocular O which throws its image into the infinite, before the beam of light enters the aforesaid circuit. The prisms $R_1$ and $R_2$ are provided with semi-silvered surfaces $r_1$, $r_2$ which allow the passage of the light through them.

Figure 10:
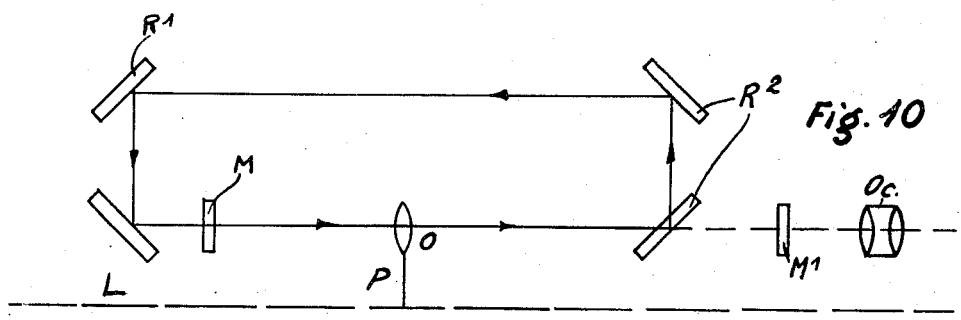

Fig. 10 shows a modification in the preceding arrangement. The sight M is located in the vicinity of the reflecting system $R_1$ constituted by a dihedron.

Its image is no longer, as in the case of Fig. 9, thrown into the infinite. Under such conditions, the light which is reflected on the end reflectors and passes twice through the ocular O of the feeler, produces at M' an image at a finite constant distance.

The observation instrument may be reduced to a single eye-piece Oc. It should be noted that, if the end reflector $R_2$ is also a dihedron, the displacements of the image due to the displacements of the ocular O find themselves added one to another and thus the arrangement allows the testing of rectilinearity.

If it is desired to perform only a testing of evenness, it is possible to do away with the half-silvering of the devices of Figs. 9 and 10 and to use two distinct object-glasses lying side by side instead of merging them into one. Obviously, it is also possible to use instead of the above mentioned object-glasses, mere spherical mirrors.

Figure 11:
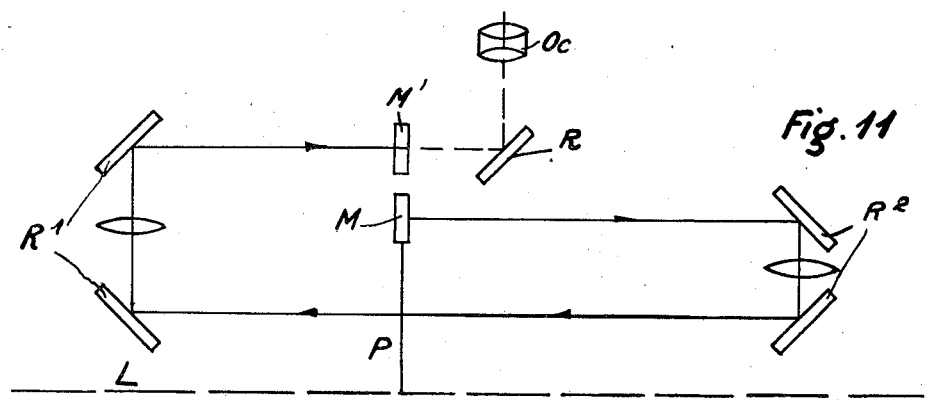

The optical systems of the feeler may be simply formed by two hair line sights M and M', as shown in Fig. 11. The end reflectors are exactly similar and comprise a prism formed by a dihedron the planes of which act as mirrors cooperating with an ocular located between them. The ocular of the two reflectors have the same focal length and are arranged in a manner such to have their main focuses at the same point. Under such conditions, the image of M displayed by the end reflectors is located in the vicinity of M' and in its plane.

The spacing between M' and the image of M varies like the double of the distance or error to be measured. The observation instrument may be a mere eye-piece Oc carried by the feeler. For greater ease of observation, the light is returned into it over a 90° angle through reflection on a silvered plane mirror R.

The measurement is made for instance through a mere micrometrical displacement of the hair lines sight with reference to the feeler carrying it.

Figure 12:
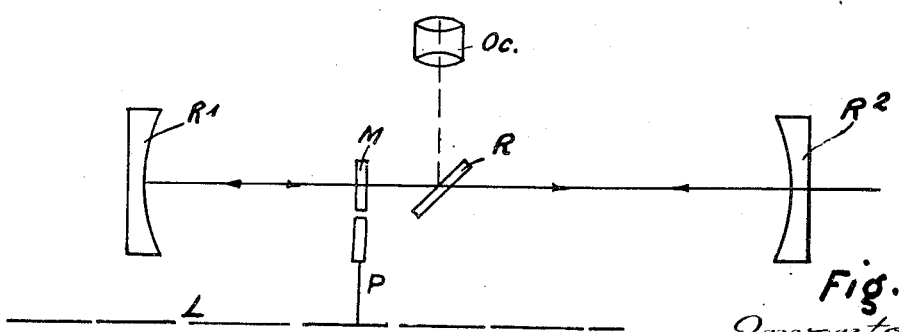

Fig. 12 shows a particularly simple form allowing the testing both of evenness and of rectilinearity. The feeler comprises a single micrometer which in reality, by reason of the twofold passage of the light, plays the part of two micrometers merged into one. The end reflectors are formed by two coaxial spherical mirrors $R_1$ and $R_2$ the focusses of which lie at the same point.

Under such conditions, the optical system constituted by the end reflectors produces an image of the sight M, after the light has passed through the constant length circuit, which image lies in the plane of the sight M itself as in the case of Fig. 11.

For testing, the sight and its image may be conveniently observed by returning the light over a 90° angle by means of a semi-silvered mirror R, fixed to the feeler. The observation may also be performed under the same conditions as in the case of Fig. 11, by means of an eye-piece Oc also fixed to the feeler.

In addition to the above described forms of execution, many others may be devised, all based on the same principles disclosed hereinabove.

It is possible, in a more general manner, to make use of compensating means, the rotation responsive elements being for this purpose used in even numbers and in a manner such that the effects of the rotation of two elements of a pair neutralise one another. This allows the use of two spherical or cylindrical mirrors.

In the examples disclosed, the light passes only once through the characteristic optical path of constant length. It should be noted also that the present invention covers all optical testing means wherein the light passes once or several times through this characteristic optical path of constant length. The feeler then carried more than two optical elements and allows the light to pass through four, six or more times. Further, features taken from different forms disclosed hereinabove may be associated with each other or with other optical means without departing from the scope of the invention.

The reflectors may, like the optical elements of the feeler, be constituted in different manners (plane mirrors, total reflection prisms, spherical or cylindrical mirrors, spherical or spherocylindrical lenses, etc.).

These reflectors should throw the light back in the direction of the feeler and moreover provide a number of reflections, the succession of which produces the addition but not the annulation through compensation of the small displacements of the images of the sight formed by each of the optical elements of the feeler.

It should finally be stated that, my new optical testing instrument offers a great advantage inasmuch as it is generally more accurate than the existing testing instruments. This is due in particular to the fact that the small transversal displacements of the image of the sight which are determined by the displacements of the feeler are revealed by at least two passages of the light beam through the optical elements carried by the feeler. The result is an amplification of the distances or errors to be measured which is all the greater when the path followed by the light is multiplied a greater number of times.

What is claimed is:

1. In an optical testing instrument in combination, an optical system comprising a sight mark, a feeler movable along the line or surface to be tested for rectilinearity or evenness and movable axially in response to unevenness in the line or surface being tested, optical elements fixed to said feeler, two stationary reflecting systems disposed on opposite sides of the optical elements fixed to said feeler and an instrument adapted for observation of movements in the plane at right angles to said line or surface of an image of said sight mark resulting from a lack of evenness of the surface or line tested, the members enumerated above of said optical system being so disposed relative to each other that on said feeler being displaced along a straightline from one of said end reflecting systems to the other, a bundle of light rays producing an image of said sight traverses a path of constant length, starting from an optical element fixed to said feeler and being reflected successively by said two reflecting systems, and returning to the other optical element.

2. The instrument of claim 1, in which the optical elements fixed to the feeler are a lens and the sight mark and the distance between the two reflecting systems is so chosen that the constant length of the path leading from the sight mark to and through the reflecting systems and to the lens is equal to the focal length of the feeler lens, whereby the image of the sight mark produced by said feeler lens is constantly in the infinite.

3. The instrument of claim 1, in which the feeler carries the sight mark and also the instrument of observation of the sight mark image, and each reflecting system includes a lens, said lenses having the same focal length and their focal planes coincident to form an afocal system so that, owing to the constancy of the path travelled by the light rays, the sight mark image is situated at a constant distance from the observation instrument connected to the feeler, and the adjustment thus remains invariable.

4. The instrument of claim 1, in which the optical elements and reflecting systems are so designed as not to change the convergence of the light rays so that owing to the constant length of the light path the apparent distance at the observation instrument remains constant and this latter instrument can be used without any new adjustment.

BERNARD EUGÈNE ADRIEN MARIE CUNY.

REFERENCES CITED

The following references are of record in the file of this patent:

UNITED STATES PATENTS

| Number | Name | Date |
|---|---|---|
| 1,488,564 | Steinle | Apr. 1, 1924 |
| 2,048,154 | Abbott et al. | July 21, 1936 |
| 2,205,517 | Devol | June 25, 1940 |
| 2,224,281 | Webber | Dec. 10, 1940 |